United States Patent [19]
Ellenor et al.

[11] Patent Number: 6,096,280
[45] Date of Patent: Aug. 1, 2000

[54] NATURAL GAS TREATMENT PROCESS

[75] Inventors: David T. R. Ellenor, Pickering; Silvano Meffe; James W. Smith, both of Toronto; Peter S. Walton, Etobicoke, all of Canada

[73] Assignee: Apollo Environmental Systems Corp., North York, Canada

[21] Appl. No.: 09/043,844

[22] PCT Filed: Jul. 28, 1997

[86] PCT No.: PCT/CA97/00536

§ 371 Date: Jul. 15, 1998

§ 102(e) Date: Jul. 15, 1998

[87] PCT Pub. No.: WO98/04337

PCT Pub. Date: Feb. 5, 1998

Related U.S. Application Data

[60] Provisional application No. 60/038,386, Feb. 14, 1997, and provisional application No. 60/022,761, Jul. 29, 1996.

[51] Int. Cl.[7] .............................. C01B 17/04; C01B 17/05
[52] U.S. Cl. ...................... 423/242.1; 423/242.6; 423/242.7; 423/243.1; 423/574.1; 423/576.4; 423/571; 423/575
[58] Field of Search .................. 423/576.4, 574.2, 423/574.1, 243.01, 242.1, 222, 220, 242.6, 242.7, 571, 575

[56] References Cited

U.S. PATENT DOCUMENTS

| 1,925,198 | 9/1933 | Melvill ................................. 423/573.1 |
| 2,043,084 | 6/1936 | Ward et al. ......................... 423/574.1 |
| 2,534,063 | 12/1950 | Ross et al. ........................... 423/574.1 |
| 4,124,685 | 11/1978 | Tarhan et al. ....................... 423/574.2 |
| 4,482,529 | 11/1984 | Chen et al. .............................. 423/243 |
| 4,855,124 | 8/1989 | Matsuoka et al. ................... 423/574.1 |

FOREIGN PATENT DOCUMENTS

| 0 346 218 A1 | 12/1989 | European Pat. Off. . |
| 2 578 531 A1 | 9/1986 | France . |
| 26 48 190 A1 | 4/1978 | Germany . |
| 36 07 029 A1 | 10/1986 | Germany ............................. 423/574.2 |
| 35 31 406 A1 | 3/1987 | Germany . |

*Primary Examiner*—Steven P. Griffin
*Assistant Examiner*—Timothy C Vandy
*Attorney, Agent, or Firm*—Sim & McBurney

[57] ABSTRACT

Hydrogen sulfide is removed from gas streams by reaction with sulfur dioxide in an autogeneously-formed aqueous acid medium according to the equation: $SO_2 + 2H_2S \rightarrow 2H_2O + 3S$ the sulfur being removed from the aqueous phase. Carbonyl sulfide and/or carbon disulfide is removed from gas streams by hydrolysis to hydrogen sulfide in the presence of a weak organic base catalyst, such as quinoline, with the hydrogen sulfide reacting with sulfur dioxide to form sulfur.

12 Claims, 2 Drawing Sheets

NATURAL GAS TREATMENT PROCESS

REFERENCE TO RELATED APPLICATIONS

This application claims the benefit of U.S. Provisional Application Ser. No. 60/038,386, filed Feb. 14, 1997 and U.S. Provisional Application Ser. No. 60/022,761, filed Jul. 29, 1996.

FIELD OF INVENTION

The present invention relates to the treatment of natural gas to remove hydrogen sulfide and other gaseous contaminants thereof and the subsequent processing of the hydrogen sulfide-containing gas stream.

BACKGROUND TO THE INVENTION

Many reservoirs of natural gas contain hydrogen sulfide and carbon dioxide which are acid gases which can be extremely corrosive when combined with each other and water. Natural gas containing such acid or sour gases must be purified (or "sweetened") to remove or decrease the concentration of such gases prior to the purified natural gas ("sweet gas") being forwarded to consumer, industrial and other markets.

The most commonly-practised process technology for acid gas removal is the absorption of the gases from the natural gas stream by a regenerable absorbing solution in a gas processing plant. In such procedures, a regenerable absorbing solution is passed in countercurrent contact with the natural gas stream to absorb the $H_2S$ and $CO_2$, as well as other sulphur compounds, from the natural gas stream, thereby reducing their concentration in the natural gas stream and purifying the natural gas stream.

The acid gas laden solution then is regenerated by steam stripping at elevated temperature and the regenerated solution is cooled and recirculated back to the natural gas contacting stage. Acid gases stripped from the solution in the regeneration step are vented from the gas processing plant for further processing. The present invention is concerned with a manner of processing such gas streams.

Chemicals that are commonly employed in such procedures include amines, esters and similar regenerable materials in which the acid gases may be absorbed. The most commonly-employed amines for this procedure include monoethanolamine (MEA), diethanolamine (DEA), methyldiethanolamine (MDEA) and diethylmonoethanolamine.

The present invention provides a novel procedure for treatment of the hydrogen sulfide-containing gas stream from a natural gas sweetening operation as described above. As described in more detail below, the process of the invention includes a step of reacting hydrogen sulfide and sulfur dioxide to form sulfur (sometimes termed the Claus reaction) in an aqueous medium. The process described herein is applicable to other gas streams which contain hydrogen sulfide, including Claus process tail gas streams and industrial flue gas streams.

There have been prior proposals of which the inventors are aware for reacting hydrogen sulfide and sulfur dioxide in an aqueous medium.

U.S. Pat. No. 1,925,198 describes contacting a hydrogen sulfide containing gas stream with a counterflowing aqueous solution of sulfur dioxide in a bubble tower to form sulfur. The sulfur dioxide solution is formed by burning sulfur to form sulfur dioxide and then absorbing the sulfur dioxide in water. Operating conditions of eight atmospheres at 40° C. are suggested for the tower, with a steam coil provided at the lower end of the tower to heat the sulfur produced in the tower above its melting point for removal from the tower.

U.S. Pat. No. 2,043,084 describes a procedure in which hydrogen sulfide is "beaten" into a bath of aqueous sulfur dioxide by violent agitation to cause reaction to form sulfur. A suspension of elemental solid sulfur in aqueous medium is withdrawn from the bath for separation of the solid sulfur.

U.S. Pat. No. 2,534,063 describes feeding hydrogen sulfide and sulfur dioxide gases to a pair of reaction tanks through which the gases are successively passed to react to form sulfur. Each reaction tank contains an aqueous acid solution, such as sulfuric acid, hydrochloric acid, phosphoric acid or acetic acid, at relatively high concentration, for example, 25 to 50% sulfuric acid, at relatively ambient temperatures. Solid sulfur product is settled out in a separator unit and the solid sulfur is withdrawn from the separator unit.

U.S. Pat. No. 4,855,124 describes the introduction of hydrogen sulfide and sulfur dioxide simultaneously into a water medium in the absence of any additive and pressurized at a pressure of at least 10 kg/cm² gauge (at least about 10 atmospheres gauge or 1100 kPa absolute) with no mechanical agitation at a pH of below 2, specifically 1.5 to 0.1, to form sulfur.

As will be apparent from the description of the present invention which follows, the present invention is concerned with a procedure for effecting reaction of hydrogen sulfide and sulfur dioxide in aqueous medium which is quite different from the procedures described in the prior art.

SUMMARY OF INVENTION

In accordance with one aspect of the present invention, there is provided a process for the removal of hydrogen sulfide from a gas stream containing hydrogen sulfide and sulfur dioxide, which comprises contacting said gas stream with an autogenously-formed aqueous acid medium having a pH of about −0.5 to about 4 at a temperature of about 0° C. to about 155° C. and a pressure of about atmospheric to less than about 1000 kPa absolute to effect reaction of hydrogen sulfide and sulfur dioxide to form sulfur in accordance with the equation:

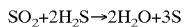

and recovering the sulfur from the aqueous medium.

This aspect of the present invention is distinguished from the prior art cited above. As noted earlier, some of the prior art requires the sulfur dioxide to be present in an aqueous medium and hence require the initial formation of such aqueous solution from sulfur dioxide gas. Other prior art requires the provision of an aqueous acid solution while other requires relatively high pressure.

In accordance with another aspect of the invention, there is provided a process from the removal of carbonyl sulfide and/or carbon disulfide from a gas stream which comprises hydrolyzing said carbonyl sulfide and/or carbon disulfide in the presence of a base catalyst to form hydrogen sulfide in accordance with equations (2) and (3):

and in the presence of sulfur dioxide, preferably a stoichiometric excess of sulfur dioxide, react with the hydrogen sulfide in accordance with the equation:

$$SO_2 + 2H_2S \rightarrow 2H_2O + 3S$$

The gas stream which is treated in accordance with this agent of the invention may further comprise hydrogen sulfide and sulfur dioxide, usually along with carbon dioxide and nitrogen, such as the gas stream leaving a Clause burner.

GENERAL DESCRIPTION OF INVENTION

Figure 1:
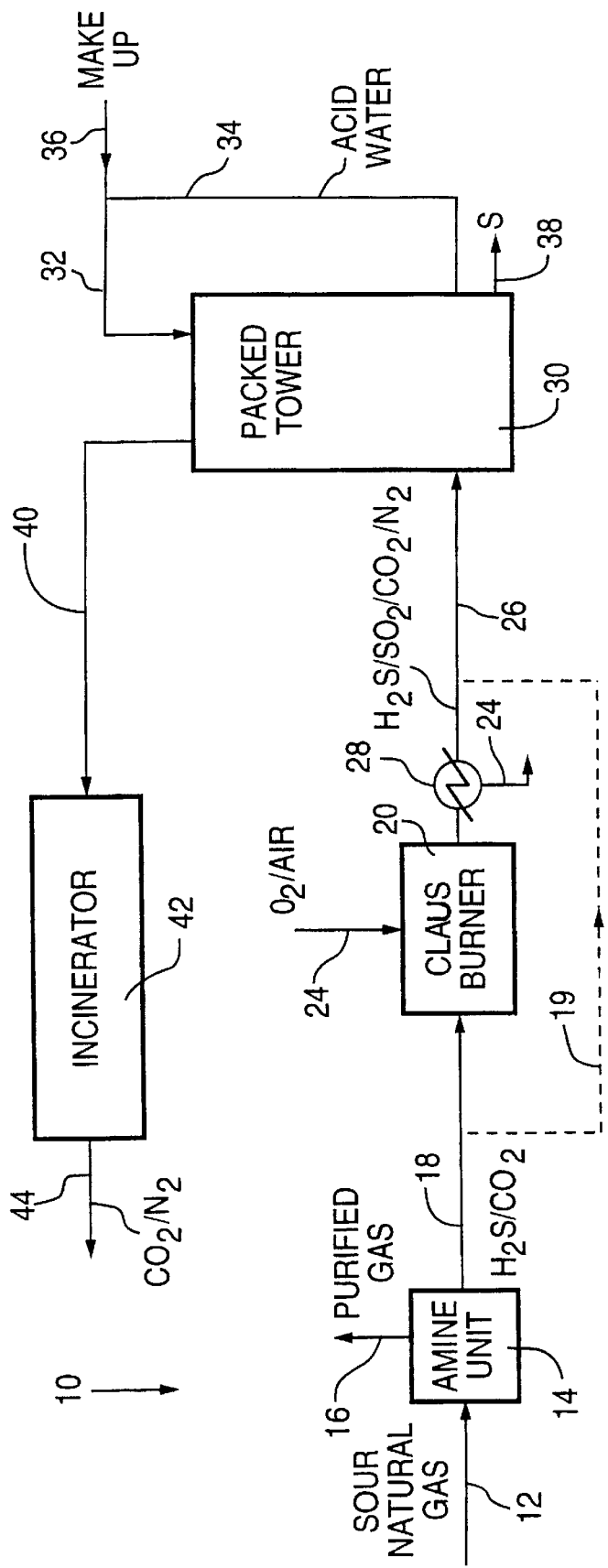
FIG. 1 is a schematic flow diagram of one embodiment of the invention.

The present invention is concerned, in one aspect, with a novel procedure for processing of the hydrogen sulfide containing gas stream from an amine natural gas purification plant, or other source of concentrated hydrogen sulfide stream, such as the tail gas stream from the Claus process or an industrial flue gas stream, wherein hydrogen sulfide in a gas stream is reacted with gaseous sulfur dioxide in an aqueous medium under relatively mild conditions to form sulfur.

The hydrogen sulfide first is burned in a Claus burner to convert approximately one-third of the molar amount of the hydrogen sulfide to sulfur dioxide to provide a gas stream having the molar ratio corresponding to the equation (1):

$$SO_2 + 2H_2S \rightarrow 2H_2O + 3S \qquad (1)$$

Depending on the initial concentration of hydrogen sulfide in the acid gas stream, a portion, namely about 25 to about 60%, of the sulfur gases may react in the Claus burner according to this equation to form sulfur which is condensed and removed from the system. Alternatively, none of the gases may react to form sulfur in the Claus burner.

Generally, the gas stream exiting the Claus burner contains hydrogen sulfide and sulfur dioxide in the stoichiometric ratio corresponding to the above equation or, preferably, a slight stoichiometric excess of sulfur dioxide. Alternatively, the gas may be mixed with an unreacted stream to provide the desired stoichiometric mixture. In general, such gas streams may contain other gaseous components, including carbon dioxide, nitrogen, carbonyl sulfide, carbon disulfide, water and other minor components, including hydrocarbons. While the invention, in particular, includes burning of hydrogen sulfide and effecting the Claus reaction, as described above, the present invention includes the processing of any hydrogen sulfide and sulfur dioxide containing gas stream from any source.

The residual gas stream from the Claus burner, containing hydrogen sulfide and sulfur dioxide in stoichiometric ratio or, more normally, in a slight stoichiometric excess of sulfur dioxide, then is passed to a packed tower, or any convenient gas-liquid contacting system, wherein the gases are countercurrently or cocurrently contacted with a recirculating stream of water, to effect reaction of the gaseous hydrogen sulfide with sulfur dioxide to form sulfur, which is removed from the tower.

The gas and liquid streams are contacted, in accordance with an aspect of the invention, at a combined gas flow rate and liquid flow rate which may vary between a running dry and flooding condition for countercurrent flow. In the case of cocurrent flow, higher gas flow rates may be employed.

The temperature of operation of the contacting device may vary between about 0° C. and about 155° C., preferably about 120° to about 150° C., more particularly from about 120° to about 130° C., to result in the formation of liquid sulfur, under a pressure of about atmospheric (101 kPa absolute) to about 1000 kPa absolute (about 145 psia), preferably about 300 kPa absolute (about 45 psia) to about 1000 kPa absolute (about 145 psia), more preferably about 300 kPa to about 860 kPa absolute. The recirculating stream of water generally autogenously provides acid conditions, which are generally in the range of pH of about −0.5 to about 4, preferably about −0.5 to about 0.2.

Any carbon dioxide, nitrogen and other non-hydrocarbon components, present in the hydrogen sulfide containing gas stream entering the gas-liquid contactor, as would typically be the case with an amine plant off gas stream, pass unchanged through the process and are vented from the system. Any residual unreacted hydrogen sulfide, carbonyl sulfide and carbon disulfide in the gas stream removed from the packed tower, or other gas-liquid contactor, may be incinerated to sulfur dioxide, which may be vented along with the carbon dioxide. Incineration also may be effected to remove any residual hydrocarbons. When a stoichiometric excess of sulfur dioxide is contained in the gas stream entering the gas-liquid contactor, in accordance with a preferred embodiment of the invention, the substantially complete reaction of hydrogen sulfide may be effected and the gas stream exiting the packed tower may contain residual sulfur dioxide, which may be vented, along with the carbon dioxide and other gases. When an incinerator must be provided for regulatory or other reasons, it is then feasible to operate with a slight excess of hydrogen sulfide.

The process provided herein for reaction of hydrogen sulfide and sulfur dioxide in an aqueous medium is a relatively simple system which enables efficient removal of hydrogen sulfide from the initial stream to be effected under relatively mild temperature and pressure conditions and to produce a high quality sulfur from the gas-liquid contactor which is at least blendable with conventional Claus plant sulfur. The process preferably is effected at a temperature where the sulfur is molten and efficient coalescence and phase separation of molten sulfur from the aqueous phase is achieved without the necessity of any additives other than water and the liquid sulfur product is readily handled.

The gas stream containing hydrogen sulfide and sulfur dioxide processed according to the above-described operation may contain carbonyl sulfide and/or carbon disulfide. The aqueous based process of reaction of hydrogen sulfide and sulfur dioxide to form sulfur may result in hydrolysis of these additional gases, in accordance with the equations (2) and (3):

$$CS_2 + H_2O \rightarrow COS + H_2S \qquad (2)$$

$$COS + H_2O \rightarrow H_2S + CO_2 \qquad (3)$$

However, it has been found that these reactions proceed with only low efficiency under acidic conditions.

Accordingly, when such gaseous components are present, it may be desirable to remove them in a separate operation. The inventors have found that, in accordance with another aspect of the invention, carbonyl sulfide and carbon disulfide may be hydrolyzed in accordance with the above equation in the presence of a weak organic base, generally an amine having a PKb of about 6 to about 11, preferably about 8 to about 10, and the hydrogen sulfide so formed reacted with sulfur dioxide. One such amine is quinoline, but other high boiling liquid amines or other organic bases may be used.

In this aspect of the invention, a carbonyl sulfide and/or carbon disulfide containing gas stream is passed countercurrently or cocurrently with an amine medium, which may be a liquid amine, in a packed tower or other suitable gas-liquid contactor, in the presence of water, which may be water vapor contained in the gas stream, and sulfur dioxide, so that the hydrogen sulfide formed in the hydrolysis reaction is reacted to form sulfur.

Such process may be effected at the temperature of about 0° C. to about 155° C., preferably at a temperature of about 120° to about 150° C., more preferably about 120° to about 130° C.

A series of reactions occur in this novel process.

Carbonyl sulfide is converted to hydrogen sulfide and carbon dioxide. Any carbon disulfide which is present may be hydrolyzed to carbonyl sulfide, which then is converted to hydrogen sulfide. The gas stream processed contains sulfur dioxide, so that the hydrogen sulfide produced reacts with the sulfur dioxide to produce sulfur.

DESCRIPTION OF PREFERRED EMBODIMENT

Referring to FIG. 1, there is shown therein a gas processing system 10 wherein a natural gas stream 12 contaminated with hydrogen sulfide and possibly other gaseous sulfur compounds and usually carbon dioxide, is passed through an amine plant 14 wherein the contaminating gases are removed from the natural gas stream and concentrated, in the manner described above, to produce a purified natural gas stream 16, suitable for further processing prior to forwarding to consumer, industrial and other markets.

The concentrated gas stream, produced from the amine unit 14 in line 18, contains mainly hydrogen sulfide and carbon dioxide. While the process of the invention is described specifically with respect to the off gas stream from an amine unit, the procedure described herein is equally applicable to any hydrogen sulfide-containing gas stream, which may also contain sulfur dioxide. For example, the hydrogen sulfide-containing gas stream may be a tail gas stream from a Claus process or an industrial flue gas stream.

The hydrogen sulfide and carbon dioxide containing gas stream passes by line 18 to a Claus burner 20 wherein a portion of the hydrogen sulfide generally is burned with oxygen fed by line 22, where technically feasible, to form sulfur dioxide. The oxygen feed in line 22 may be provided by air, oxygen or oxygen-enriched air.

The proportion of the hydrogen sulfide which is converted to sulfur dioxide in the Claus burner 20 generally is about one-third of the molar amount of hydrogen sulfide in the gas stream in line 18, so as to provide a gas stream in the Claus burner 20 containing a molar proportion of hydrogen sulfide to sulfur dioxide of about 2:1, preferably a slight excess of sulfur dioxide to ensure complete reaction of hydrogen sulfide and other reduced sulfur compounds during subsequent processing.

In the Claus reaction burner 20, a proportion of the gaseous mixture of hydrogen sulfide and sulfur dioxide react together according to the equations (1) and (4):

$$2H_2S + SO_2 \rightarrow 3S + 2H_2O \quad (1)$$

$$2H_2S + O_2 \rightarrow 2S + 2H_2O \quad (4)$$

with the resulting liquid sulfur being removed from the system by line 24. The proportion of the gases in the Claus burner 20 which react by the above equations (1) and (4) may range up to about 60% of the sulfur gases fed to the Claus burner 20, depending on the concentration of the individual gases in the burner 20.

The gas stream exiting the Claus burner 20, containing hydrogen sulfide, sulfur dioxide, carbon dioxide, as well as nitrogen, water, possibly carbonyl sulfide, carbon disulfide and other components, such as hydrocarbons, is forwarded by line 26 through a heat exchanger 28 to a packed tower 30.

The process of the invention is applicable to any other source of a gas stream containing hydrogen sulfide and sulfur dioxide for reaction in a gas-liquid contactor. For example, a portion of the gas stream 18 may bypass the Claus burner 20 and may be mixed with the gas stream 26 downstream of the heat exchanger 28 to provide the desired stoichiometry of the gas stream, as seen by dotted line 19 in FIG. 1.

In the packed tower 30, the gas stream is countercurrently-contacted with an aqueous medium fed by line 32, to effect reaction of hydrogen sulfide and sulfur dioxide to form sulfur in accordance with the equation (1):

$$2H_2S + SO_2 \rightarrow 3S + 2H_2O \quad (1)$$

While the countercurrent flow of gas and liquid in the packed tower 30 is illustrated, cocurrent flow of gas and liquid are possible to effect the reaction of hydrogen sulfide with sulfur dioxide to form sulfur. In addition to the primary reaction of hydrogen sulfide with sulfur dioxide, carbonyl sulfide and carbon disulfide also may be hydrolyzed in the packed tower, according to the equations (2) and (3):

$$CS_2 + H_2O \rightarrow COS + H_2S \quad (2)$$

$$COS + H_2O \rightarrow H_2S + CO_2 \quad (3)$$

Residual COS and $CS_2$ contained in the off gas stream from the packed tower 30 may be processed for their removal in a second packed tower, as described below with respect to FIG. 2.

The aqueous medium contacting the gas stream in the packed tower 30 generally has a pH of about −0.5 to about 4, preferably from about −0.5 to about 0.2. Such acidity is formed autogenously from the reactants following start up.

The contact of the acid aqueous medium with the gas stream in the packed tower 30 preferably is effected at a temperature above the melting point of sulfur, generally about 120° C. to about 155° C., preferably about 120° C. to about 130° C., and under a superatmospheric pressure of about 300 kPa absolute to about 1000 kPa absolute (about 45 to about 145 psia), preferably about 300 to about 860 kPa absolute (about 45 to about 125 psia).

The acid aqueous medium is recycled from the base of the tower 30 back to the feed line 32 by line 34 with any required make up water being added by line 36. The hydrogen sulfide and sulfur dioxide react in the packed tower 30 in the presence of the water in accordance with the reaction of equation (1) to form sulfur, which separates readily as molten sulfur from the aqueous phase at the preferred reaction temperatures described above and the liquid sulfur product, which is highly pure, is removed from the lower end of the packed tower by line 38.

The purity of sulfur which is produced in the packed tower 30 by the process of the invention is in contrast to many prior art procedures which produce low grade sulfur, which must be disposed of. The sulfur product produced by the process of the invention is fully blendable with commercial sulfur grades.

The combination of gas flow and liquid flow in the packed tower 30 may be effected between running dry and flooding conditions for the countercurrent flow of the gas stream and liquid stream.

The packed tower 30 is dimensioned to permit the hydrogen sulfide and sulfur dioxide to react substantially completely in accordance with the above equation (1).

Preferably, the gas stream which is fed to the packed tower 30 contains a small stoichiometric excess of sulfur dioxide to ensure that all the hydrogen sulfide entering the packed tower 30 is converted to sulfur.

The off gas stream from the packed tower 30 in line 40 contains carbon dioxide, nitrogen and any residual unreacted non-hydrocarbon gases, such components of the gas stream in line 26 being substantially unaffected by the reactions in the packed tower 30. Any hydrocarbons which may be present in the acid gas feed stream in line 18 often cause difficulties in conventional Claus plant operations by producing carbonyl sulfide and carbon disulfide into the Claus burner and deactivating the Claus catalyst beds by the production of carsul. These difficulties are not encountered in the process of the present invention in the packed tower 30 since heterogenous catalysis is not relied on.

Depending on the nature and concentration of such unreacted gases in the off-gas stream in line 40, further processing of the gas stream may be effected before venting of the off-gas stream to atmosphere. For example, any residual hydrogen sulfide in the gas stream 40 may be reacted in an incinerator 42 to form sulfur dioxide, or any carbonyl sulfide and/or carbon disulfide may be processed as described below with respect to FIG. 2. In the event of incineration, any hydrocarbons present in the off-gas stream are converted to carbon dioxide and water. The residual gas stream, containing carbon dioxide, nitrogen and water vapor, is vented by line 44.

Figure 2:
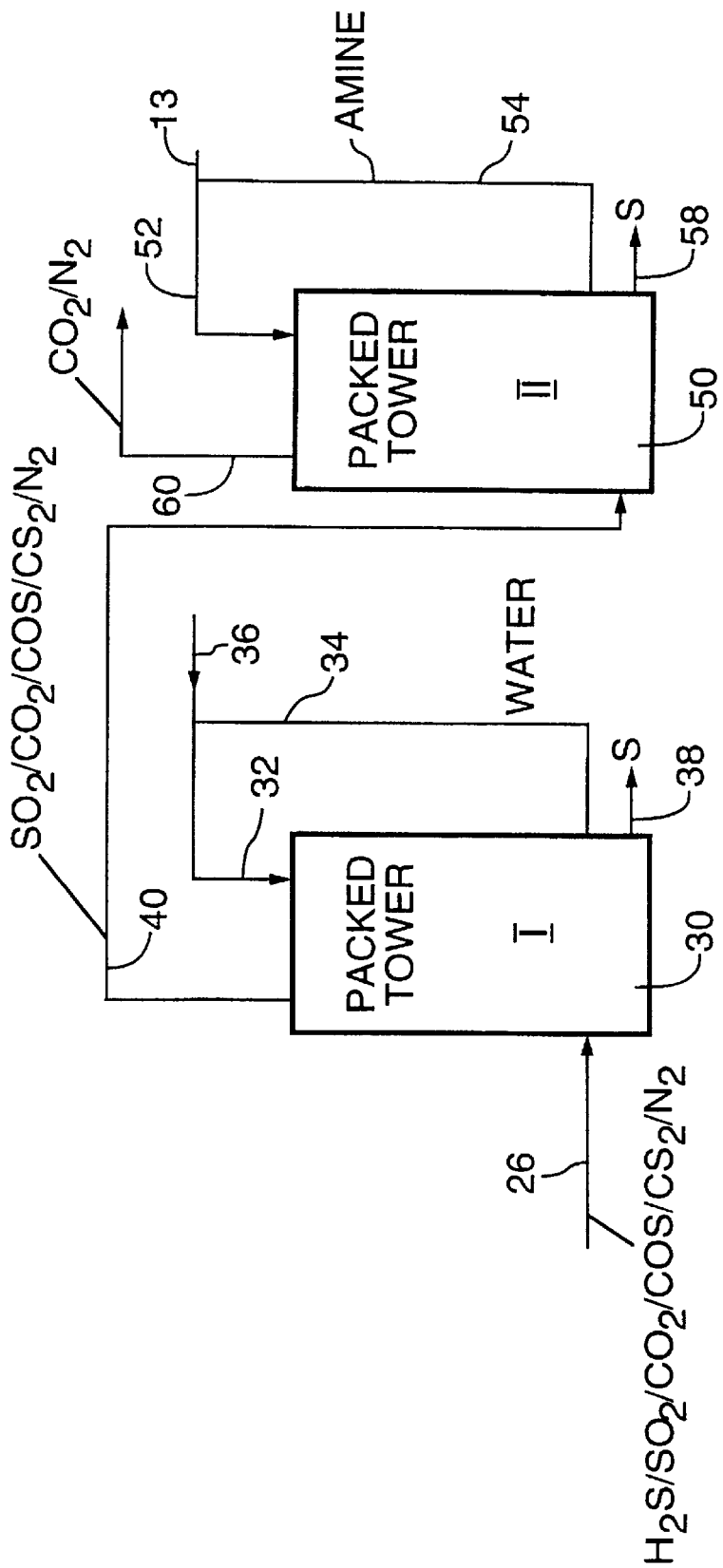
FIG. 2 is a schematic flow diagram of another embodiment of the invention.

Turning now to FIG. 2, there is shown therein an embodiment wherein a second packed tower 50, or other convenient gas-liquid contactor, is added. This embodiment is applicable to a gas stream 26 which contains carbonyl sulfide and/or carbon disulfide as components thereof, which often is the case when the amine unit 14 is the source of the hydrogen sulfide gas stream in line 18.

In the packed tower 30, some hydrolysis of carbonyl sulfide and carbon disulfide may occur according to the equations (2) and (3):

$$COS + H_2O \rightarrow H_2S + CO_2 \quad (2)$$

$$CS_2 + H_2O \rightarrow COS + H_2S \quad (3)$$

However, the majority of the carbonyl sulfide and carbon disulfide present in the gas stream in line 26 pass through the packed tower 30. In this embodiment, an excess of sulfur dioxide is employed in the gas stream 26, so that the gas stream 40 venting the packed tower 30 contains sulfur dioxide, carbon dioxide, nitrogen carbonyl sulfide and/or carbon disulfide and water vapour. The gas stream 40 also may contain any unreacted carbonyl sulfide and carbon disulfide.

The carbonyl sulfide and carbon disulfide containing gas stream 40 is fed to the second packed tower 50 wherein the gas stream is countercurrently-contacted with a liquid amine or other base fed by line 52 to effect hydrolysis of the carbonyl sulfide in the presence of water and of the liquid amine or other base acting as a catalyst, in accordance with the equation (2):

$$COS + H_2O \rightarrow H_2S + CO_2 \quad (2)$$

The water may be provided by water vapor in the gas stream in line 52 and/or may be present in the amine. Similarly any carbon disulfide is hydrolysed in the presence of the amine or other base according to the equation (3):

$$CS_2 + H_2O \rightarrow COS + H_2S \quad (3)$$

with the carbonyl sulfide so formed being further hydrolysed in accordance with the above equation (2). The hydrogen sulfide produced by these reactions as well as any residual hydrogen sulfide in the gas stream 40 reacts in the second packed tower 50 with sulfur dioxide to form sulfur, according to the equation (1):

$$2H_2S + SO_2 \rightarrow 3S + 2H_2O \quad (1)$$

While countercurrent flow of gas and liquid are illustrated for the packed tower 50, cocurrent flow may be employed to effect the various reactions described above.

The amine employed in the second packed tower 50 may be any high boiling liquid amine which remains liquid at the reaction temperature, which generally may have a $pK_b$ determined under standard conditions of about 6 to about 11, preferably about 8 to about 10. One particular amine which may be used is quinoline ($pK_b$ 9.2). The contact of the amine with the gas stream in the second packed tower 50 may be effected over a wide range of temperature from about 0° to about 155° C., preferably about 120° to about 150° C., more preferably about 120° to about 130° C., to result in the formation of molten sulfur.

The amine is recycled from the base of the second packed tower 50 to the feed line 57 by line 54 with any required make-up amine being added by line 56. The sulfur which is formed by the reaction of hydrogen sulfide and sulfur dioxide in the second packed tower may be removed from the second packed tower 50 by line 58. The combination of gas flow and liquid flow in the packed tower 50 may be effected between running dry and flooding conditions for the countercurrent flow of the gas stream and liquid stream, or higher for cocurrent flow.

The packed tower 50 is dimensioned to permit the gases to react substantially completely in accordance with the above equations (1), (2) and (3). The off gas stream from the packed tower 50 in line 60 contains carbon dioxide, nitrogen and water vapor along with any unreacted sulfur dioxide, which then may be vented to atmosphere, after condensation of amine and water vapour therefrom, as required.

The hydrolysis of carbonyl sulfide to hydrogen sulfide and carbon dioxide in the presence of an amine catalyst is considered to be a novel process and separate from the invention of the reaction of gaseous hydrogen sulfide and sulfur dioxide to sulfur in the gas-liquid contact tower in water, as described in detail above.

EXAMPLES

Example 1

This Example shows the removal from a gas stream of hydrogen sulfide and sulfur dioxide in the aqueous phase at ambient temperatures.

Experiments were carried out in a bench scale contactor comprising a glass tube 380 mm high and 45 mm inside diameter fed with a single gas sparger at an ambient temperature of about 25° C.

The results are shown in the following Table 1:

TABLE 1

| Total Rate of Flow mL/sec | Volume % and Ratio of $H_2S:SO_2$ Gases In | Volume % and Ratio of $H_2S:SO_2$ Gases Out | Removal % $H_2S/SO_2$ |
| --- | --- | --- | --- |
| 7.2 | 17.5/8.3 (2.10) | 1.5/0.2 (1.87) | 92/97 |
| 7.8 | 16.1/8.4 (1.92) | 1.0/0.3 (1.87) | 94/96 |

As may be seen from the data in Table 1, a highly efficient removal of hydrogen sulfide and sulfur dioxide may be obtained in aqueous medium at ambient temperatures.

Example 2

This Example shows the removal from a gas stream of hydrogen sulfide and sulfur dioxide in the aqueous phase at elevated temperatures to form liquid sulfur.

A series of experiments was carried out in a pilot scale reactor comprising a tower having 0.9. In of packing with an inside diameter of 75 mm packed with 6 mm Raschig rings. Water or dilute sulfuric acid was circulated through the packed tower at a volumetric circulation rate of 13.3 mL/sec for runs of about 4 to 8 hours. The packed tower was maintained at 405 kPa absolute and a temperature of 125° C.

A gas stream containing varying proportions of gases in nitrogen was fed at a total volumetric flow rate of 170 mL/sec in countercurrent flow to the solvent. The results of these experiments are set forth in the following Table 2:

TABLE 2

| GAS STREAM | IN Volume % | OUT Volume % | Removal Efficiency | Removal Ratio | Solvent |
|---|---|---|---|---|---|
| $H_2S$ | 3.44 | 1.98 | 42.44 | | |
| $SO_2$ | 1.27 | 0.38 | 70.08 | 1.64 | $H_2O$ |
| $H_2S$ | 3.45 | 2.01 | 41.74 | | |
| $SO_2$ | 1.45 | 0.41 | 71.72 | 1.38 | $H_2O$ |
| $H_2S$ | 19.31 | 3.23 | 83.27 | | |
| $SO_2$ | 9.18 | 0.38 | 95.86 | 1.83 | $H_2O$ |
| $H_2S$ | 20.81 | 3.53 | 83.04 | | |
| $SO_2$ | 9.27 | 0.63 | 93.20 | 2.00 | $H_2O$ |
| $H_2S$ | 9.95 | 3.98 | 60.00 | | |
| $SO_2$ | 4.67 | 1.39 | 70.24 | 1.82 | 0.5N $H_2SO_4$ |
| $H_2S$ | 20.87 | 7.07 | 66.12 | | |
| $SO_2$ | 9.93 | 3.00 | 69.79 | 1.99 | 1.0N $H_2SO_4$ |
| $H_2S$ | 4.72 | 3.47 | 26.48 | | |
| $SO_2$ | 2.32 | 1.91 | 17.67 | 3.05 | 1.0N $H_2SO_4$ |
| $H_2S$ | 10.48 | 1.95 | 81.39 | | |
| $SO_2$ | 5.16 | 1.00 | 80.62 | 2.05 | $H_2O$ |
| $H_2S$ | 8.79 | 2.67 | 69.62 | | |
| $SO_2$ | 4.94 | 1.36 | 72.47 | 1.71 | $H_2O$ |
| $CO_2$ | 27.47 | | | | |
| $H_2S$ | 10.70 | 3.34 | 68.79 | | |
| $SO_2$ | 4.93 | 1.21 | 75.46 | 1.98 | $H_2O$ |
| $CO_2$ | 51.60 | | | | |
| $H_2S$ | ~10 | | 64.34 | | |
| $SO_2$ | ~5 | | 67.34 | 1.59 | $H_2O$ |
| COS | .6945 | .5406 | 22.16 | | |
| $CO_2$ | ~50 | | | | |
| $H_2S$ | ~10 | | 62.09 | | |
| $SO_2$ | ~5 | | 80.71 | 1.80 | $H_2O$ |
| COS | .7346 | .6521 | 11.23 | | |
| $CO_2$ | ~25 | | | | |
| $H_2S$ | ~10 | | 54.75 | | |
| $SO_2$ | ~5 | | 70.87 | 1.51 | 1.0N $H_2SO_4$ |
| COS | .7607 | .7994 | ~5.09 | | |
| $CO_2$ | ~50 | | | | |
| $H_2S$ | ~10 | | 72.88 | | |
| $SO_2$ | ~5 | | 81.56 | 1.64 | 1.0N $H_2SO_4$ |
| COS | .7353 | .5988 | 18.56 | | |
| $CO_2$ | ~25 | | | | |

As seen from the data presented in Table 2, the reaction of hydrogen sulfide with sulfur dioxide takes place with a high efficiency of removal of both gases. The design may be optimized for at least 95% removal of both gases by procedures known to those skilled in the art.

The water autogenously becomes acidic during the process. This autogenous acidification takes time to come to equilibrium and this fact is reflected in removal ratios of less than the stoichiometric volume of 2. However, simply initially acidifying the water with strong acid, such as sulfuric acid, depresses rather than enhances the reaction.

The presence of $CO_2$ in the gas stream has some effect on the removal efficiencies. This effect may be overcome by an appropriate column design. The process has little effect on carbonyl sulfide in the gas stream and a separate removal operation is required (see Example 3 below).

Example 3

This Example shows the removal from the gas stream of carbonyl sulfide, hydrogen sulfide and sulfur dioxide in two stages, a first stage with water and a second stage with a liquid amine.

Experiments were carried out in a bench scale contactor comprising two glass tubes, each 380 mm high and 45 mm in diameter each fed with a single gas sparger. A total gas flow through the two glass tubes of 11.5 mL/sec was employed. 400 mL water was used in the first glass tube and 400 mL quinoline was used in the second glass tube along with water vapor carryover. Experiments were carried out at temperatures of 29° C. and 70° C.

The results obtained in the experiments are set forth in the following Tables 3 and 4:

TABLE 3

| | IN (vol. %) | | OUT (vol. %) | | Removal Efficiency (%) | |
|---|---|---|---|---|---|---|
| Temp. (° C.) | 29° | 70° C. | 29° | 70° C. | 29° | 70° C. |
| $H_2S$ | 6.81 | 6.71 | 0.41 | 0.06 | 94 | 99 |
| $SO_2$ | 4.43 | 4.40 | 0.23 | 0.24 | 95 | 95 |
| COS | 3.12 | 2.98 | 2.02 | 0.78 | 35 | 74 |
| $CO_2$ | — | — | 1.15 | 2.21 | — | — |

TABLE 4

| | Ratios of Moles of Gas Removed | |
|---|---|---|
| Temperature (° C.) | 29° | 70° C. |
| $H_2S/SO_2$ | 1.52 | 1.60 |
| $(H_2S + COS)/SO_2$ | 1.79 | 2.13 |

As may be seen from Tables 3 and 4, enhanced levels of carbonyl sulfide removal were achieved. High overall efficiency levels for $H_2S$ and $SO_2$ removed were achieved for both hydrogen sulfide and sulfur dioxide. The data in Tables 3 and 4 suggest that the hydrolysis of COS to $H_2S$ and $CO_2$ took place followed by further reaction of the hydrogen sulfide with sulfur dioxide to form sulfur.

Example 4

This Example illustrates the removal of carbonyl sulfide from a gas stream containing carbonyl sulfide and sulfur dioxide using quinoline.

A 400 ml gas sparger vessel with an inside diameter of 45 mm and a height of 380 mm had a 6 mm diameter glass tube extending inside the vessel from the top down to 30 mm from the vessel bottom to allow for introduction of gas mixtures to the vessel. A 6 mm diameter glass tube was located on the top perimeter of the vessel to allow for venting contacted gases. Experiments were carried out on the removal of carbonyl sulfide using 360 ml quinoline and 40 ml water at ambient temperature (about 20° to 25° C.) 8.3 ml/sec of gas was passed through the solution.

In a first experiment, a gas stream having an average inlet concentration of 0.61 vol. % carbonyl sulfide and 0.55 vol. % sulfur dioxide, with the balance nitrogen was passed through the tube. The average outlet concentrations were 0.02 vol. % carbonyl sulfide and 0.05 vol. % sulfur dioxide, balance nitrogen and water vapor with a trace of carbon dioxide.

The average gas concentrations were obtained over a steady state period of three and one-half hours and correspond to average removal efficiencies of 97 and 91% for carbonyl sulfide and sulfur dioxide, respectively. Sulfur was observed to form in solution and rapidly settled. At the end of this experiment, the sulfur dioxide feed was turned off and 8.3 ml/sec of gas with an average inlet concentrations of 0.86 vol. % carbonyl sulfide, balance nitrogen was passed into the vessel. The average outlet concentration was 0.02 vol. % carbonyl sulfide, balance nitrogen and water. Further sulfur was formed, indicating that the carbonyl sulfide reacted the stoichiometric excess sulfur dioxide absorbed by the quinoline solution during the first phase of the experiment.

In a second experiment, another gas stream having an average inlet concentrations of 2.02 vol. % carbonyl sulfide and 0.91 vol. % sulfur dioxide, balance nitrogen was passed into the reaction vessel containing quinoline and water. The average outlet concentrations were 0.00 vol. % carbonyl sulfide and 0.00 vol. % sulfur dioxide, balance nitrogen and water vapour, as measured by gas chromatography. The average gas concentrations were obtained over a steady state period of two and one-half hours. The outlet concentrations were also confirmed with a gas detector tube at 270 ppmv carbonyl sulfide and 30 ppmv sulfur dioxide. Sulfur was observed to form in solution and settled from the solution.

The removal of the stoichiometric excess of carbonyl sulfide in the latter experiment shows that some of the carbonyl sulfide was removed by absorption in the quinoline.

Example 5

This Example illustrates the removal of carbon disulfide from a gas stream containing carbon disulfide and sulfur dioxide using quinoline.

The experiments described in Example 4 were repeated using 8.3 ml/sec of a gas stream with an average inlet concentrations of 0.11 vol. % of carbon disulfide and 0.13 vol. % sulfur dioxide, balance nitrogen passed into the reaction vessel. The average outlet concentrations were 0.01 vol. % carbon disulfide and 0.00 vol. % sulfur dioxide, balance nitrogen and water. The average concentrations were obtained over a steady state period of two and one-half hours and correspond to average removal efficiencies of 92 and 100% for carbon disulfide and sulfur dioxide, respectively. Sulfur was observed to form in solution and rapidly settled.

SUMMARY OF THE DISCLOSURE

In summary of this disclosure, the present invention, in one aspect, provides a novel process for the reaction of hydrogen sulfide and sulfur dioxide in the aqueous phase to form sulfur. Hydrogen sulfide and sulfur dioxide are reacted by countercurrent or cocurrent flow of gas and aqueous medium having a pH of about −0.5 to 4 and preferably at a temperature of about 120° to about 155° C. and a pressure of about 300 kPa absolute to about 1000 kPa absolute (about 45 to about 145 psia) to form liquid sulfur, which is separated from the aqueous phase. In another aspect, the present invention provides a novel process for the hydrolysis of carbonyl sulfide and carbon disulfide in the presence of an amine catalyst and sulfur dioxide to form sulfur by countercurrent or cocurrent flow of gas and liquid amine. Modifications are possible within the scope of this invention.

What is claimed is:

1. A process for the removal of hydrogen sulfide from a first gas stream comprising a concentrated hydrogen sulfide gas stream from a natural gas sweetening process, which comprises:

partially oxidizing said concentrated hydrogen sulfide gas stream to form a second gas stream containing hydrogen sulfide and sulfur dioxide having a proportion of sulfur dioxide which is either stoichiometric or a slight stoichiometric excess of that required by the equation (1):

$$H_2S + SO_2 \rightarrow H_2O + 3S \qquad (1)$$

said second gas stream comprising carbonyl sulfide and/or carbon disulfide, contacting said second gas stream with an autogenously-formed aqueous acid medium having a pH of about −0.5 to about 4 at a temperature of about 0° to about 155° C. and a pressure of above atmospheric to about 1000 kPa absolute to effect reaction of hydrogen sulfide and sulfur dioxide in accordance with said equation (1) to form sulfur and to hydrolyze a proportion of said carbonyl sulfide and/or carbon disulfide in said autogenously-formed acid aqueous medium in accordance with equations (2) and (3):

$$CS_2 + H_2O \rightarrow COS + H_2S \qquad (2)$$

$$COS + H_2O \rightarrow H_2S + CO_2 \qquad (3)$$

to form a third gas stream containing unreacted carbonyl sulfide and/or carbon disulfide, recovering the sulfur from the aqueous medium, hydrolyzing unreacted carbonyl disulfide and/or carbon disulfide in said third gas stream in the presence of quinoline to form hydrogen sulfide in accordance with the reactions of equations (2) and (3), reacting the hydrogen sulfide so formed with a stoichiometric excess of sulfur dioxide present in said quinoline in accordance with equation (1) to form sulfur.

2. The process of claim 1 wherein said hydrolyzing step in quinoline is effected at a temperature of about 0° to about 155° C.

3. The process of claim 2 wherein said temperature is about 120° to about 150° C.

4. The process of claim 3 wherein said temperature is about 120° to about 130° C.

5. A process for the removal of carbonyl sulfide and/or carbon disulfide from a gas stream, which comprises:

hydrolyzing said carbonyl sulfide and/or carbonyl disulfide to hydrogen sulfide in the presence of quinoline in accordance with equations (2) and (3):

$$CS_2 + H_2O \rightarrow COS + H_2S \qquad (2)$$

$$COS + H_2O \rightarrow H_2S + CO_2 \qquad (3)$$

and in the presence of sulfur dioxide to react with the hydrogen sulfide so formed in accordance with the equation (1):

$$SO_2 + H_2S \rightarrow 2H_2O + 3S \qquad (1)$$

to form sulfur.

6. The process of claim 5 which is carried out by countercurrent or cocurrent gas-liquid contact in a gas-liquid contact tower.

7. The process of claim 6 wherein said gas stream is fed to the bottom of said gas-liquid contact tower while quinoline is fed to the top of the tower to flow in countercurrent contact with said gas stream and a gas stream having a reduced carbonyl sulfide and/or carbon disulfide content is removed from the top of the gas-liquid contact tower.

8. The process of claim 7 which is carried out at a temperature of about 0° to about 155° C.

9. The process of claim 8 wherein said temperature is about 120° to about 150° C.

10. The process of claim 9 wherein said temperature is about 120° to about 130° C.

11. The process of claim 5 wherein said gas stream further comprises hydrogen sulfide and sulfur dioxide.

12. The process of claim 11 wherein said gas stream further comprises carbon dioxide and nitrogen.

* * * * *